No. 749,313. PATENTED JAN. 12, 1904.
C. A. MILLER.
END SEAT FOR ELLIPTICAL SPRINGS.
APPLICATION FILED SEPT. 18, 1903.
NO MODEL.
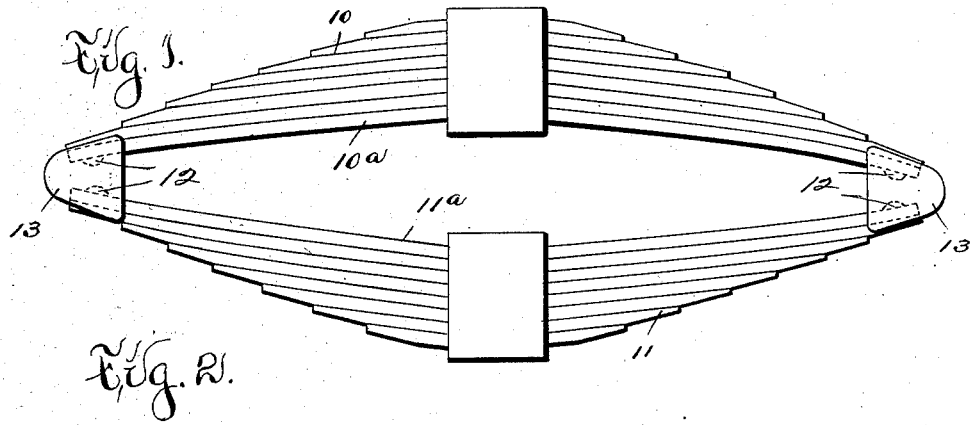
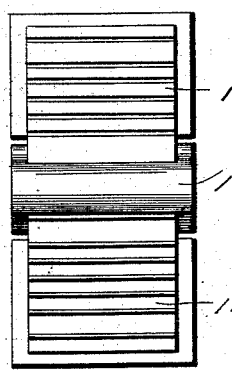
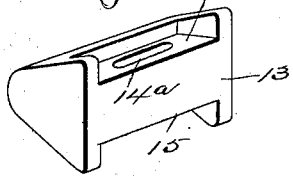
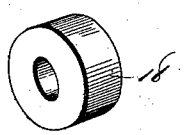
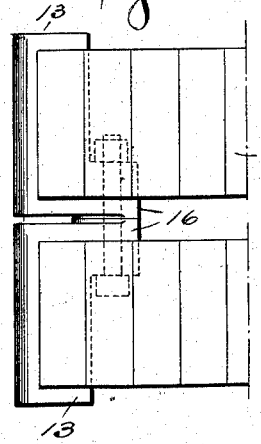
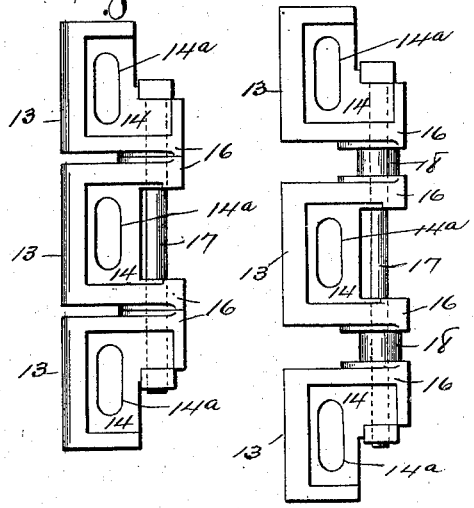
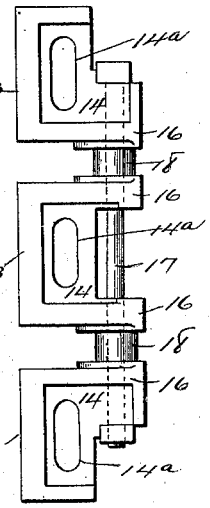
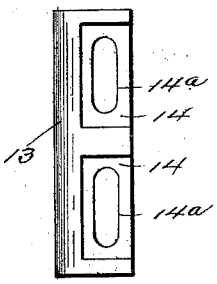
Attest:
R. S. Orwig
W. E. Ellis
Inventor Charles A. Miller
by J. E. Swert Atty.

No. 749,313. Patented January 12, 1904.

UNITED STATES PATENT OFFICE.

CHARLES A. MILLER, OF MARSHALLTOWN, IOWA.

END SEAT FOR ELLIPTICAL SPRINGS.

SPECIFICATION forming part of Letters Patent No. 749,313, dated January 12, 1904.

Application filed September 18, 1903. Serial No. 173,671. (No model.)

*To all whom it may concern:*

Be it known that I, CHARLES A. MILLER, a citizen of the United States of America, and a resident of Marshalltown, Marshall county, Iowa, have invented a new and useful End Seat for Elliptical Springs, of which the following is a specification.

The object of this invention is to provide improved end seats or end bearings for elliptical springs whereby the ends of the upper members of each spring are mounted on and connected to the ends of the lower members thereof.

A further object of my invention is to provide improved means for connecting parallelly-arranged springs in pairs, triplets, or multiples.

My invention consists in the construction, arrangement, and combination of elements hereinafter set forth, pointed out in my claims, and illustrated by the accompanying drawings, in which—

Figure 1 is an elevation illustrating a single elliptical spring supplied with my improvement. Fig. 2 is an end view of the device shown in Fig. 1. Fig. 3 is a perspective of one of the end seats or bearings detached from the spring. Fig. 4 is a plan illustrating a modified form of end seat or bearing adapted for connecting pairs of elliptical springs in parallel arrangement. Fig. 5 is a plan illustrating a modified form of end seat or bearing adapted for connecting three elliptical springs in parallel arrangement. Fig. 6 is a plan illustrating a further arrangement of parallel elliptical springs and involving the use of spacing washers or thimbles. Fig. 7 is a perspective of one of the spacing washers or thimbles detached from the other devices. Fig. 8 is a further-modified form of end seat adapted for connecting pairs of elliptical springs in parallel arrangement, and a similar construction may be employed in any multiple of the springs.

In the construction of the device as shown in Figs. 1, 2, and 3 the numeral 10 designates the upper member, and 11 the lower member, of an elliptical spring. Each member 10 11 may be formed of any desired number of leaves or laminæ and be connected in any desired manner. The inner leaf $10^a$ $11^a$ of each member has a boss, stud, or projection 12 (dotted lines in Fig. 1) on the face of its end portions, and said boss may be oval or circular in plan view. A seat-block 13 is provided and made of a single piece of metal by forging or molding. The seat-block 13 is substantially triangular in cross-section and is formed with an inclined depression or seat 14 in one face and an inclined seat or depression 15 in its opposite face, the seats or depressions being in converging planes and separated by the body of the block. Each seat or depression 14 15 is of a length corresponding to the width of the inner leaf $10^a$ or $11^a$ and of a width to receive a considerable portion of said leaf. A further seat or depression $14^a$ $15^a$ is formed in the body of the seat-block and opens to the seat or depression 14 or 15 and is oval or round in plan view and of a size and shape to receive and retain the bosses or studs 12 of the leaves $10^a$ $11^a$ of the springs. The engagement of the bosses or studs 12 in the depressions or seats $14^a$ $15^a$ limits and determines any slipping of the leaves relative to the seat-blocks, and the arrangement of the leaves in the seats or depressions 14 15 on converging planes limits and determines longitudinal expansion or contraction of the leaves independent of the blocks. Thus any longitudinal expansion of the upper member of the spring occasioned by the application of pressure thereto is communicated to the lower member through the seat-blocks because of the engagement of the bosses in the depressions or seats $14^a$ $15^a$. In like manner the longitudinal contraction of either member is communicated to the other member.

Sometimes it is desirable to connect two or more elliptical springs parallel with each other, and in that event the seat-blocks may be made of greater length and be provided with a plurality of seats end to end in their upper and lower faces, as shown in Fig. 8, the ends of the inner leaves of the lower members engaging in the lower seats and supporting the blocks and the ends of the inner leaves of the upper members resting in and supported by the upper seats of said blocks.

Sometimes it is desirable to provide pivotal connections between the parallel springs, and in such event ears 16 are formed on the seat-blocks 13 and are centrally apertured to receive a bolt 17 between the leaves or members of the springs, whereby the blocks may be arranged end to end and pivotally connected. The blocks 13 may be provided with an ear on one end or an ear on each end, dependent on the number of springs to be connected, as illustrated in Figs. 4 and 5.

Sometimes it is desirable to space apart the springs to accommodate different dimensions of the supporting or supported body, and in that event the construction shown in Fig. 6 may be followed, wherein washers or thimbles 18 are mounted on the bolts 17 between the springs.

In either event the primary structure is the same—*i. e.*, a seat-block formed with converging seats in opposite faces and further seats or depressions opening thereto and arranged to receive bosses on the spring-leaves.

I claim as my invention—

1. The combination of the spring members formed with bosses on the ends thereof, seat-blocks formed with converging seats in opposite faces to receive the ends of the spring members, and also formed with further seats opening to the converging seats and arranged to receive said bosses, 2. A seat-block formed with converging seats or depressions in opposite faces and also formed with further seats or depressions opening to the first, and spring members shaped to engage in said seats or depressions.

3. The combination of spring members, end blocks therefor and means for connecting said end blocks in multiples.

4. A multiple spring, comprising end blocks, means for connecting said end blocks and semi-elliptical spring members above and below and engaging said end blocks.

5. A multiple spring, comprising end blocks, means for connecting said end blocks, each of said end blocks formed with converging seats in opposite faces and also formed with further seats opening to the converging seats, semi-elliptical spring members above and below and engaging in the converging seats of the end blocks, and bosses on the end portions of said spring members and engaging in the innermost seats of the end blocks.

Signed by me at Marshalltown, Iowa, this 12th day of August, 1903.

CHARLES A. MILLER.

Witnesses:
P. M. PAULLIN,
C. A. CRANDALL.